Oct. 11, 1966 D. BERDAN ETAL 3,277,589

ELECTRICAL EXPERIMENT KIT

Filed Nov. 5, 1964

INVENTORS.
DAVID BERDAN &
JACK A. COWAN, JR.
BY
Brumbaugh, Free, Graves & Donohue
their ATTORNEYS 3,277,589

ELECTRICAL EXPERIMENT KIT

David Berdan, Freehold, and Jack A. Cowan, Jr., Mountainside, N.J., assignors to Buck Engineering Company, Inc., Freehold, N.J., a corporation of New Jersey Filed Nov. 5, 1964, Ser. No. 409,205
4 Claims. (Cl. 35—19)

This invention relates to an electrical experiment kit and, more particularly, to a novel and improved electrical experiment kit in which the electrical or electronic components are readily and quickly attached to and detached from a mounting board and are stored in an organized manner in a case in which they are also attached to avoid damage when handled and from which they are readily detached for use.

An increasingly popular hobby is the designing and construction of electrical and electronic devices of various kinds. The construction is often aided to a considerable extend by first building temporary experimental circuits making up the device. Moreover, making up temporary circuits is also useful as a practical educational experience, and an important part of education in electrical and electronic circuitry is the actual construction of circuits and, accordingly, laboratory experiment periods are generally provided in physics, electrical circuits and electronics courses in schools and colleges.

In the hobby, experimental and educational uses of temporary electrical apparatus, the components of the circuits are often simply laid out on a table and connected together. There is, however, in such a case a significant chance of creating short circuits and also of introducing variables into the circuits, particularly in electronic circuits, by movement of the various elements relative to each other. Therefore, it is also common to provide a "breadboard," generally in the form of a piece of hardboard or the like having closely spaced holes. The components are attached to the "breadboard" by nuts and bolts or by clips and then wired together.

The use of a "breadboard" has an important disadvantage in that the attachment of the circuit components to it and the removal of the components when the circuit is no longer needed is cumbersome and time consuming, and detracts significantly from the enjoyment of the user and from the usefulness of the "breadboard."

The foregoing and other disadvantages of "breadboards" and other presently known apparatus for constructing temporary electrical circuits, are overcome, in accordance with the invention, by a novel and improved electrical experiment kit comprising a mounting member of an electrically non-conductive material, a plurality of electrical components for assembly on the mounting member and connection with each other to form a circuit, and means including first and second elements on the components and on the mounting member selectively engageable by being pressed together and disengageable by being pulled apart for removably attaching the components to the mounting board.

A preferred attaching means for the kit is of the type which comprises one strip of material which has closely spaced, semi-rigid filaments in the form of hooks upstanding from it and another strip of material to which a layer of loosely intertwined, looped fibers is attached. Such attaching means is often referred to as "hook and loop cloth" and is available commercially, for example, under the trade name "Velcro."

The mounting board may desirably form the detachable cover of a case in which the components are carried and stored and, further, the case preferably has a number of drawers or shelves, each of which is provided with the same elements of the attaching means as are provided on the mounting board. Thus, the electrical components may be firmly attached in the drawers or shelves in the case for transport and storage in the same manner that they are attached on the mounting board.

In the preferred embodiment of the invention, each of the electrical components is mounted on a plate and is connected by electrical conductors to terminals secured on the plate. The undersurface of the plate carries the other of the attaching means elements.

It has been found that hook and loop cloth provides a very secure attachment of the electrical elements on the mounting board, and that it is preferable to provide a relatively limited area of contact in order to facilitate removal of the elements. If large surfaces of the hook and loop cloth were engaged to attach the elements to the mounting board, then their removal from the mounting board would be more difficult. Thus, an important feature of the invention is to provide a limited area of attachment, i.e., an area sufficient to adequately retain the components on the board and at the same time permit their removal with a minimum of pulling force. Thus, it is preferable to provide the element of the hook and loop cloth carried by the mounting board in the form of relatively narrow strips. Each of the electrical components is then provided with the other element of the hook and loop cloth in strips spaced apart substantially the same distance as the strips on the mounting member.

For a better understanding of the invention, reference may be made to the following description of an exemplary embodiment, taken in conjunction with the figures of the appended drawings, in which.

Figures 1, 2, 3:
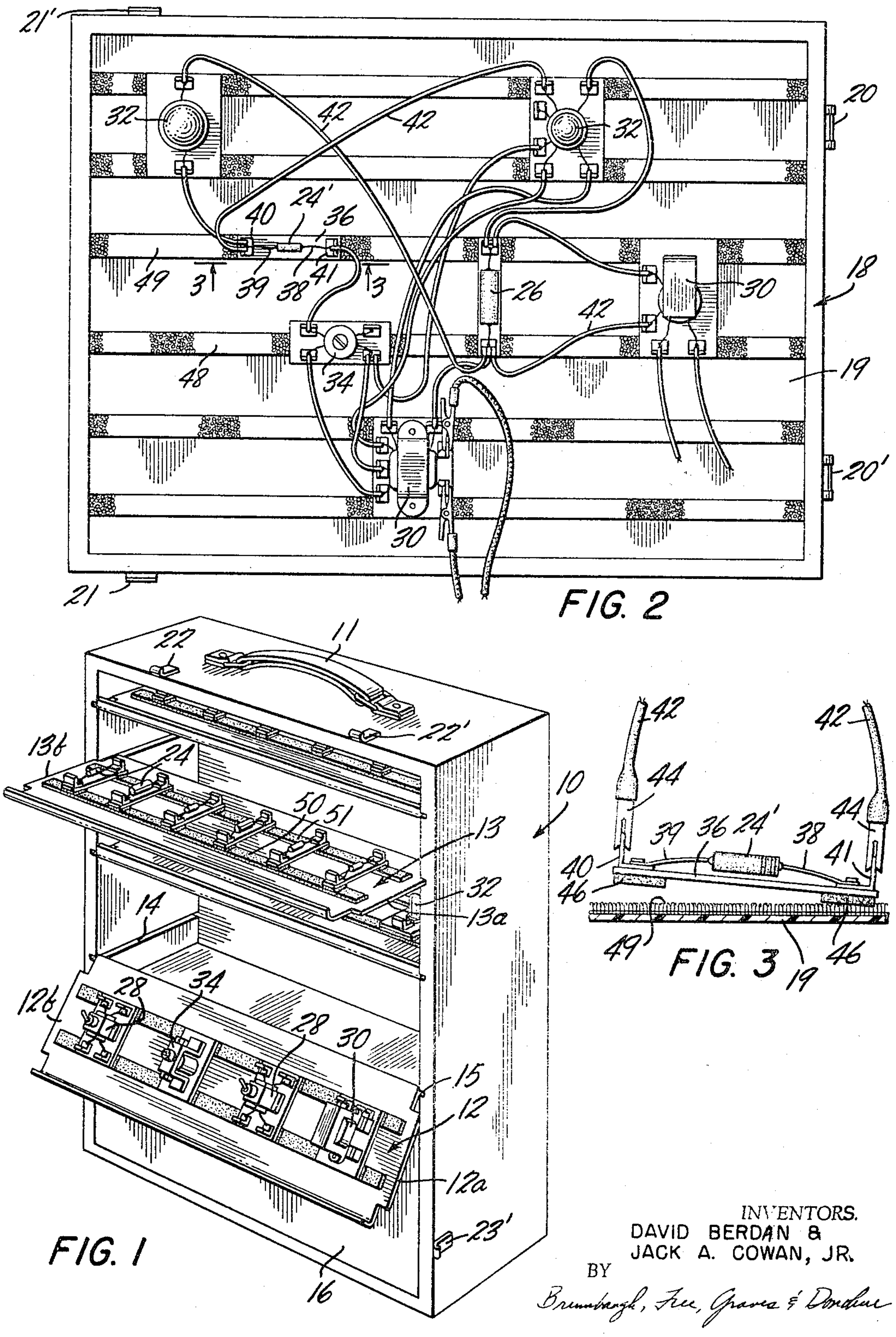
FIGURE 1 is a pictorial view of a case carrying a number of trays or shelves, each of which receives a plurality of electrical components for storage.
FIGURE 2 is a plan view of the interior of the cover of the case of FIG. 1 which also serves as a mounting board for the experiment kit.
FIGURE 3 is a side view in section, taken generally along the line 3—3 of FIG. 2 and in the direction of the arrows, of a segment of the mounting board with an electrical component attached thereon, the component being shown in a partially detached position.

Referring to FIG. 1, the electrical experiment kit includes a carrying and storage case 10 of suitable construction having a carrying handle 11 at its upper end. As illustrated, the case 10 is generally rectangular and is arranged to stand in an upright position with the long axis disposed vertically and the narrow depth dimension disposed horizontally. In the case are a plurality of slidable shelves 12, 13, etc. A preferred type of shelf includes extensions 12*a*, 12*b*, 13*a* and 13*b* at opposite ends which are slidably received in slots, e.g., 14 and 15, formed in the opposite side walls of the case 10. Preferably, the shelves are arranged to drop down into an angular position, as illustrated by the shelf 12 in FIG. 1, when pulled out by providing outwardly extending pins (not shown) near the back edges of the shelves which fall onto undercuts (not shown) near the front ends of the grooves 14 and 15. Thus, when the shelves are slipped outwardly, the pins drop into the undercuts and the shelves are hingeably retained at their back edges and pivot into a downward angular position, as shown. In addition to shelves, the carrying case may include drawers or compartments, such as the compartment 16 at the bottom.

Referring now to FIG. 2, the front 18 (which is not shown in FIG. 1) of the carrying case 10 includes a front wall member serving as a mounting board 19 which is made of a non-conductive material, such as wood, plastic, or hardboard. The mounting board 19 is surrounded by a peripheral non-conductive frame which is provided with coupling elements or hinges and latches 20, 20' and 21, 21' which cooperate with companion elements 22, 22' and 23, 23' on the case 10 for removably attaching the cover 18 to the body of the case. The coupling elements may be of any suitable type and are thus not described in detail.

The electrical experiment kit includes a variety of electrical and electronic components, such as assorted resistors 24, capacitors 26, switches 28, transformers 30, electronic tubes and sockets 32, and potentiometers 34. As exemplified by the resistor 24' shown in FIG. 3, the components are mounted on plates 36 and are coupled by electrical conductors 38 and 39 to electrical terminals 40 and 41 which are affixed to the plates 36. The terminals on the plates are of any suitable type to and from which connectors 44 on the conductors are easily connected and disconnected.

The plates 36 carrying the various electrical components have one element of a hook and loop cloth, such as "Velcro," attached on their lower surfaces. Referring particularly to FIG. 3, the element having loosely intertwined looped fibers thereon, which is referred to hereinafter as the loop cloth 46, is attached as by adhesive adjacent opposite ends of the plate in the form of narrow strips. In general, the strips of loop cloth 46 extend entirely across the shorter ends of the plates 36 of each component.

Referring again to FIG. 2, and also to FIG. 3, the surface of the mounting board 19 which is on the interior of the case when the cover 18 is in place thereon, is provided with a plurality of parallel, spaced-apart strips 48, 49 etc. of the companion elements of the hook and loop cloth having the closely spaced, semi-rigid, hooked filaments, that is, the hook cloth, the strips 48, 49 being suitably attached, as by means of adhesive to the mounting board 19. The strips 48, 49 are spaced-apart at a distance substantially equal to the spacing of the loop cloth strips 46 on the plates 36 carrying the electrical components so that the components may be mounted on the board by aligning the lengthwise dimension of the loop cloth strips 46 with the lengthwise dimension of hook cloth strips 48 and 49 on the mounting board, such as represented by the tubes 32, the transformers 30 and the capacitor 26 illustrated in FIG. 2. The elements can, of course, also be mounted in the other direction as represented by the resistor 24' and the potentiometer 34 illustrated in FIG. 2.

In use, the hook and loop cloth provides secure, and at the same time, easily removable attachment of the electrical components to the mounting board 19. The components are attached to the mounting board 19 by simply aligning them in the desired position with respect to the hook cloth strips 48 and 49 and then pressing the electrical component downwardly, thereby embedding the looped fibers of the loop cloth in the hook filaments of the hook cloth. If during the assembly of the electrical circuits, it is desired to move one or more of the components or at such time as the assembled circuit is no longer needed, the components are to be removed, the components are easily detached from the board by simply pulling upwardly. In this regard, the plates 36 carrying the components are spaced from the surface of the board, thereby making it easy for the user to grasp the edges of the plates to detach them from the mounting board 19. Referring to FIG. 3, the user will find in a relatively short time that removal is facilitated by pulling up one end of the plate 36 first, as depicted by the left end of the plate in FIG. 3, and thereafter pulling up the other end.

It is to be noted that the hook and loop cloth is provided in relatively narrow strips and that the hook and loop connection between the components and the mounting board is therefore of relatively limited area. The area of attachment by the hook and loop cloth should be sufficient to provide reasonably secure attachment of the components on the mounting board 19 so that the connection of wires to the terminals and some handling of the mounting board may be accomplished without dislodging the components. Nevertheless, the area of attachment between the hook and loop cloth elements should be kept at a minimum, in order to facilitate the removal of the components when desired.

Referring again to FIG. 1, each of the shelves 12 and 13 in the case 10 is provided with strips 50 and 51 of the hook cloth, the strips being parallel and spaced-apart a distance equal to the spacing of the strips 48 and 49 on the mounting board 19. The electrical components are thus readily stored in the drawers in an organized fashion, and after use, each component may be placed in its proper position and will be held therein by engagement of the hook and loop cloth. By providing suitable indicia on the shelves 12 and 13 and by attaching the components in their proper places in the storage case, the components may be found quickly and easily when desired for use. Moreover, the possibility of damaging the components when handling the case, which could result if they were retained loosely in the case, is avoided. Nevertheless, the components are readily removed from the shelves for use.

It will be understood by those skilled in the art that the above-described embodiment of the invention is merely exemplary and, that modifications and variations thereof may be made by those skilled in the art without departing from the spirit and scope of the invention. All such modifications and variations are intended to be within the scope of the invention as defined in the appended claims.

We claim:

1. An electrical layout board comprising a mounting member of an electrically non-conductive material, a plurality of electrical components for assembly on said mounting member and connection with each other to form electrical circuits, said mounting member having on its surface a plurality of spaced-apart parallel strips of web material having a plurality of closely spaced semi-rigid hook filaments upstanding therefrom, said electrical components being mounted on plates of non-conductive material, the bottom surfaces of said plates having thereon a web material having loosely intertwined looped fibers thereon, said hook filaments and looped fibers being selectively engageable by being pressed together and disengageable by being pulled apart for removably attaching said components to said board, said spacing between said strips being related to the dimensions of said plates so that said plates may be attached to said strips in either of two mutually perpendicular directions and said spacing between said strips providing gaps between the bottoms of said plates and the surface of said mounting member facilitating the grasping of the edges of said plates for removal of said components from said board.

2. An electrical layout board according to claim 1 wherein said web material and looped fibers on said plates are in the form of pieces spaced-apart on the plates a distance equal to the spacing between said strips on said mounting member.

3. An electrical layout board comprising a mounting member of an electrically non-conductive material, a plurality of electrical components for assembly on said mounting member and connection with each other to form electrical circuits, said mounting member having on its surface a plurality of spaced-apart parallel strips of web material having loosely intertwined looped fibers thereon, said electrical components being mounted on plates of non-conductive material, the bottom surfaces of said plates having thereon a web material having a plurality of closely spaced semi-rigid hook filaments extending therefrom, said hook filaments and looped fibers being selectively engageable by being pressed together and disengageable by being pulled apart for removably attaching said components to said board, said spacing between said strips being related to the dimensions of said plates so that said plates may be attached to said strip in either of two mutually perpendicular directions, and said spacing between said strips on said mounting member providing gaps between the bottoms of said plates and the surface of said board facilitating grasping the edges of said plates for the removal of said components from said board.

4. An electrical layout board according to claim 3 wherein said web material and hook filaments on said plates are in the form of pieces spaced-apart on said plates a distance equal to the spacing between said strips.

References Cited by the Examiner

UNITED STATES PATENTS 2,857,588 10/1958 Fiske ------------ 35—19.1 X

FOREIGN PATENTS 629,590 10/1961 Canada.
1,300,206 6/1962 France.

OTHER REFERENCES

"Electronics" magazine, February 1952 (pp. 178, 182 and 186).

"Electronic Design" magazine, March 1955 (pp. 50, 51).

"Radio-Electronics" magazine, February 1957, (pp. 4, 78, 79 and front cover).

"Teaching Electricity and Electronics," 4-page leaflet from Science Electronics, Inc., Cambridge, Mass., published April 1958.

EUGENE R. CAPOZIO, *Primary Examiner.*

H. S. SKOGQUIST, *Assistant Examiner.*